(12) United States Patent
Gandler

(10) Patent No.: US 7,784,049 B1
(45) Date of Patent: Aug. 24, 2010

(54) SYSTEM AND METHOD FOR PROVIDING A PLURALITY OF VIRTUAL COMPUTING ENVIRONMENTS THAT EFFICIENTLY USE DATA IN THE VIRTUAL ENVIRONMENTS

(75) Inventor: Mark Gandler, Wellesley Hills, MA (US)

(73) Assignee: EMC Corporation, Hopkinton, MA (US)

( * ) Notice: Subject to any disclaimer, the term of this patent is extended or adjusted under 35 U.S.C. 154(b) by 1270 days.

(21) Appl. No.: 11/324,530

(22) Filed: Jan. 3, 2006

(51) Int. Cl.
  *G06F 9/455* (2006.01)
  *G06F 15/16* (2006.01)
  *G06F 9/00* (2006.01)
  *G06F 12/00* (2006.01)
  *G06F 11/00* (2006.01)

(52) U.S. Cl. .............................. 718/1; 709/211; 713/1; 711/114; 714/9

(58) Field of Classification Search ...................... 718/1; 709/211; 713/1; 711/114; 714/9
See application file for complete search history.

(56) References Cited

U.S. PATENT DOCUMENTS

| | | | | |
|---|---|---|---|---|
| 6,529,944 | B1* | 3/2003 | LeCrone | 709/211 |
| 7,017,003 | B2* | 3/2006 | Murotani et al. | 711/100 |
| 7,266,719 | B1* | 9/2007 | LeCrone et al. | 714/9 |
| 7,284,151 | B2* | 10/2007 | Chandrasekaran | 714/9 |
| 7,356,679 | B1* | 4/2008 | Le et al. | 713/1 |

\* cited by examiner

*Primary Examiner*—Meng-Ai An
*Assistant Examiner*—Adam Lee
(74) *Attorney, Agent, or Firm*—Krishnendu Gupta; Robert Kevin Perkins

(57) ABSTRACT

This invention is a system and method related to providing a plurality of different virtual computing environments in a data storage environment. A system and method that includes configuring the server as a virtual machine server including a plurality of virtual machines and a virtual kernel. A plurality of logical units are assigned to virtual machines. The logical volumes are available to the virtual machine server through a mirroring operation. The logical volumes are associated with metadata to create a plurality of different virtual computing environments.

12 Claims, 10 Drawing Sheets

SYSTEM AND METHOD FOR PROVIDING A PLURALITY OF VIRTUAL COMPUTING ENVIRONMENTS THAT EFFICIENTLY USE DATA IN THE VIRTUAL ENVIRONMENTS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This application generally relates to data storage, and more particularly to using Virtual Machines with business continuance volumes or clones or snapshots in a data storage environment for fast access to large amounts of data.

RELATED APPLICATION

This U.S. Patent application is related to an application with Ser. No. 11/324,975 entitled "System and Method for Multiple Virtual Computing Environments in Data Storage Environment" being filed on even date, Jan. 3, 2006, to inventor Mark Gandler and assigned to EMC Corporation of Hopkinton, the same assignee as this application.

BACKGROUND

Computer systems may include different resources used by one or more host processors. Resources and processors in a computer system may be interconnected by one or more communication connections. These resources may include, for example, data storage systems, such as the Symmetrix™ or CLARiiON™ (also referred to herein as Clariion) family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

Virtual processing such as EMC's VMware is another known area that offers advantages in data processing, including in the area of apparent configuration to a user. It would be advancement in both the virtual processing and data storage arts to exploit better the respective individual capabilities for reaping more and better benefits for users in the respective fields.

SUMMARY

To overcome the problems of the prior art mentioned above and to provide advantages also described above, this invention is a system and method for providing a plurality of different virtual computing environment.

The method operates in a data storage environment having a server in communication with a data storage system having physical data storage mapped logical volumes. It includes the steps of (a) configuring the server as a virtual machine server including a plurality of virtual machines and a virtual kernel; (b) storing a plurality of first logical volumes associated with metadata in a first storage bank; (c) storing a plurality of second logical volumes associated with basis data in a second storage bank; and (d) making first and second logical volumes selected from the first storage bank and the second storage bank available to the virtual machine server through a mirroring operation, wherein one or more second logical volumes associated with basis data and being selected from the plurality of second logical volumes stored in the second storage bank are paired with a plurality of first logical volumes associated with metadata from the first storage bank to create a plurality of different virtual computing environments and such that the same first logical volume of basis data may be paired with different second logical volumes of metadata in the different virtual computing environments.

In one embodiment, the invention is implemented as steps in a process. In other embodiments, implementations include a system, and a computer program product, wherein each embodiment is configured for carrying out the steps involved in the methodology.

BRIEF DESCRIPTION OF THE DRAWING

The above and further advantages of the present invention may be better understood by referring to the following description taken into conjunction with the accompanying drawings in which identical numbers for elements appearing in different drawing figures represent identical or similar elements throughout the figures.

DETAILED DESCRIPTION OF THE PREFERRED EMBODIMENTS

Introduction

Figure 1:
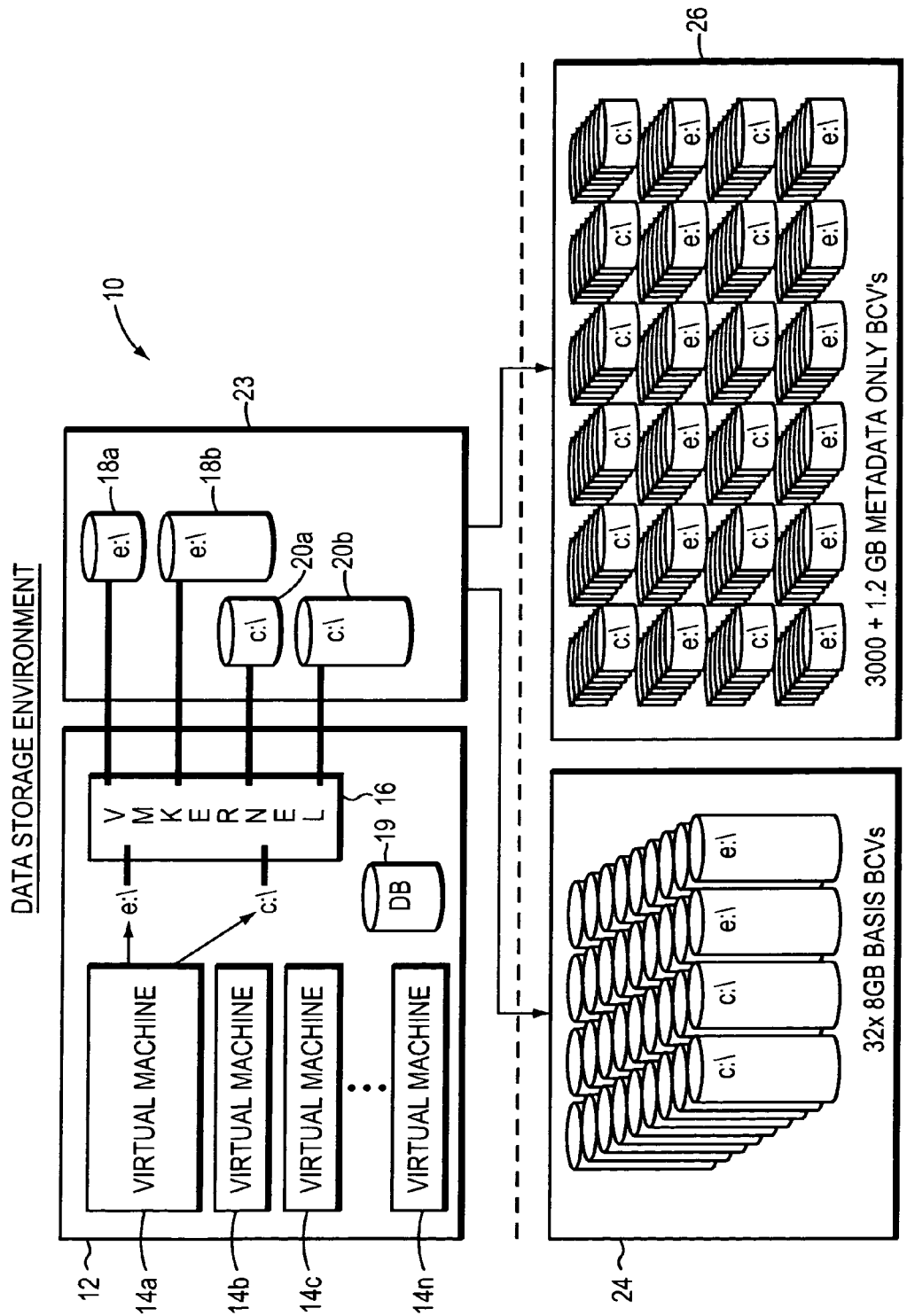
FIG. 1 shows a block diagram of a data storage environment denominated as a jukebox environment and including at least one Virtual Machine and a plurality of logical volumes used by the at least one Virtual Machine for data storage and other purposes.

In the preferred embodiment, the embodiment operates in cooperation and may be a part of computer software, operating the preferred EMC CLARiiON or Symmetrix storage systems available from EMC Corporation of Hopkinton, Mass., although one skilled in the art will recognize that the invention may be used with other data storage systems. In the preferred embodiment, EMC Symmetrix storage system implements aspects of the present invention as part of software that operates with such a storage system. In this preferred embodiment, a locally accessible mirror copy of a specified Logical volume or Logical Unit (LU or LUN), or logical mirror copy is available for backups or other host processes. The logical mirror copy may also be useful for operations that change data, such as production testing or data warehousing, without disrupting the production data.

Typically, the inventive methods and software of this invention may be used with EMC's TimeFinder and local replication applications such as Business Continuance Volumes (BCVs) (discussed in the incorporated '497 patent referenced below) or Clones or Snapshots. However, the present invention may be used without requirement of such BCVs or Snapshots. For the sake of completeness, operational features embodied in EMC's Timefinder and Symmetrix are described in U.S. Pat. No. 6,101,497 issued Aug. 8, 2000, and also in U.S. Pat. No. 5,206,939 issued Apr. 27, 1993, each of which is assigned to EMC, the assignee of this invention, and each of which is hereby incorporated by reference. Consequently, the following discussion makes only general references to the operation of such systems.

EMC's VMware virtual processing is available from VMware of Palo Alto, Calif., USA and in a preferred embodiment includes the VMware ESX Server technology. In a computer that has hardware processor and memory, VMware technology provides a Virtual Machine monitor (VMM) and a Virtual Machine (VM) that has at least one virtual processor and is operatively connected to the VMM for running a sequence of VM instructions, which are either directly executable or non-directly executable. The VMM includes a binary translation sub-system and a direct execution sub-system, as well as a sub-system that determines if VM instructions must be executed using binary translation, or if they can be executed using direct execution. Shadow descriptor tables in the VMM, corresponding to VM descriptor tables, segment tracking and memory tracing are used as factors in the decision of which execution mode to activate. The VMware technology, including the ESX server, is particularly well-adapted for virtualizing computers in which the hardware processor has an Intel x86 compatible architecture, and is described in U.S. Pat. No. 6,397,242 to Devine et. al, issued May 28, 2002 and assigned to VMware, owned by EMC Corporation, the assignee of the present invention. This '242 patent is hereby incorporated in its entirety by this reference. Consequently, the following discussion makes only general references to the operation of such VMware technology.

Overview of a Preferred Embodiment

In a preferred embodiment, Program Logic which may be provided on a computer readable medium, as described below, and/or operating in computer memory cooperates with VMware and EMC TimeFinder or similar logic for providing business continuance volumes (BCVs) or the like, including snapshots, for making large storage in the form of addressable Logical Units available and useable to a Virtual Machine, such as a Virtual Machine server like the VMware ESX Server. One skilled in the art will recognize that the invention is not limited to such preferred embodiments; however, they are described herein as an example of implementing the invention.

A Preferred Embodiment Description

Referring to FIG. 1, a Data Storage Environment 10 also referred to herein as a Jukebox environment is shown including a VMware ESX Server 12 having a series of Virtual Machines 14a-n, a database 19 and VM Kernel 16. The VMware ESX Server is available from VMware, an EMC company, of Palo Alto, Calif., USA. The Server engages on Data Storage System 23 logical units 18a-b and 20a-b, designated with virtual drive designations e:\ and c: \, respectively. The logical units are actually populated with source data from a bank of BCVs 24, such as a bank of thirty two (32) quantity and eight (8) Gigabyte basis BCVs. Bank 26 is a separate bank of more numerous metadata-only volumes. Storage Banks 24 and 26 are included as part of Data Storage System 23, and are shown separately for emphasis and clarity of view but typically are included as part of the System 23.

The VMware ESX Server is configured to boot Virtual Machines (VMs) from external storage. In the example case of a preferred embodiment shown in FIG. 1, a Data Storage System 23 (e.g. EMC Symmetrix) contains both the boot volume (c:\) and another volume (e:\) for a preferred Windows 2000 VM. This configuration is a good choice, but one skilled in the art would recognize that any VMware-supported Guest operating system would work well in view of the teachings herein. Currently, such Guest operating systems include most of the popular x86 operating systems, including Windows and Linux. Similarly, additional drives could be added, up to half the supported number of Logical Unit Numbers (LUNs) on an ESX Server.

The Jukebox environment adds several items to the default ESX Server configuration. It adds a small pool of unmapped basis Business Continuity Volumes (BCVs) within the Symmetrix, each of which is 8 GB. Such BCVs and policies, practices, and protocols used with such are discussed in the incorporated '497 patent, so such policies, practices, and protocols are only briefly discussed herein, and the same is true of TimeFinder. It also adds a rather large pool of unmapped 1.2 GB metadata-only BCVs. The data on all these volumes is replicated via EMC TimeFinder operations (discussed below) onto LUNs mapped to the ESX Server host. Mapped LUNs have the same size and emulation as the BCVs. In production, these TimeFinder operations can be extremely rapid. On current hardware, the majority take less than 60 seconds to execute. A database 19 is added, to keep track of which volumes can be correctly paired, i.e., volume pairs, and also which such volume pairs can be made available to each VM.

Figure 10:
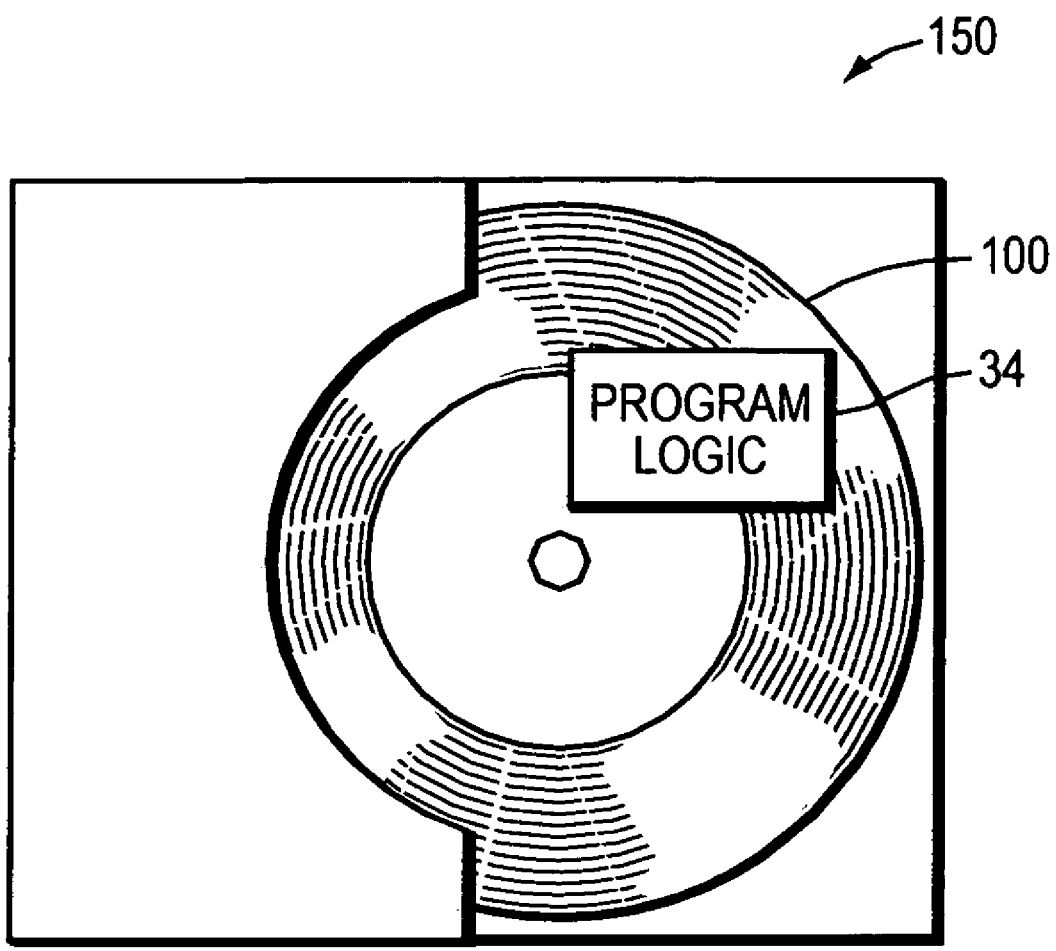
FIG. 10 shows a computer-readable medium including computer-executable code including the program logic for carrying out method steps of the method embodiments of the present invention.

Referring to FIG. 10, Program Logic 34 may include computer software for carrying out methodology discussed herein, although it is possible for it to be embodied in whole or part in hardware or firmware. Program Logic 34 may be embodied on a computer program product 150 including a computer-readable medium 100, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Figure 2:
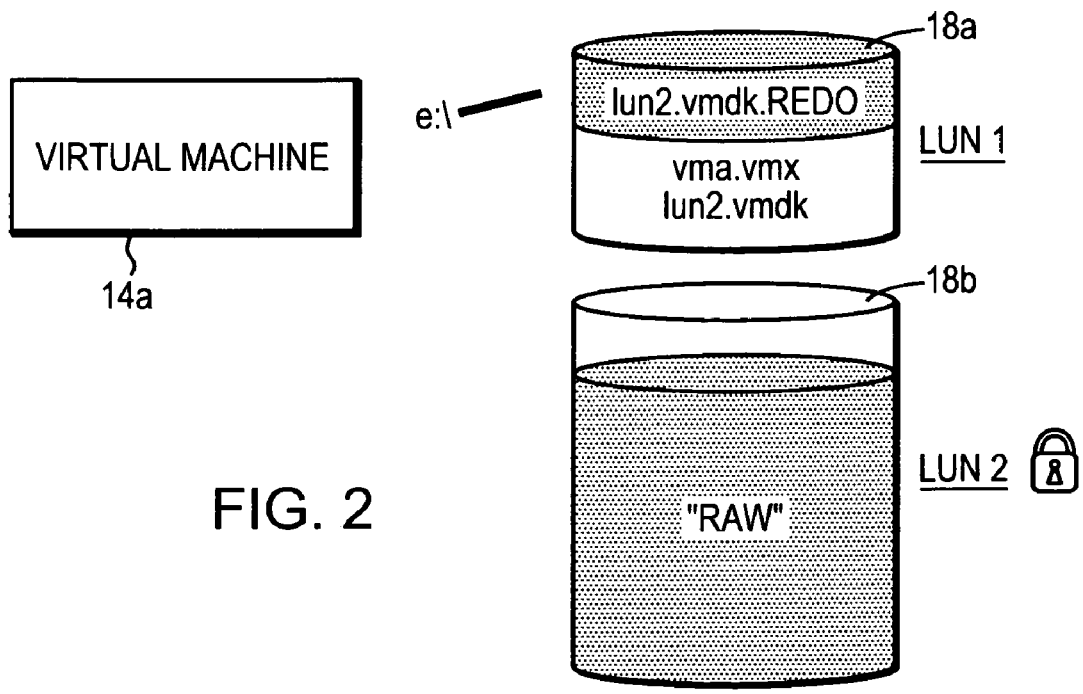
FIG. 2 is a simple schematic of at least a portion of the jukebox environment of FIG. 1.

Regarding FIG. 2, taking a closer look at one of the volume pairs that has been discussed with reference to FIG. 1, it can be seen that logical volume 18a also known as LUN 1 has the VMware VM configuration (.vmx) file. It also has the two other files that comprise the e:\ drive for Virtual Machine 14a. First, LUN 1 has a pointer—called lun2.vmdk—to the "raw disk" at logical volume 18a also known as LUN 2, where most of the data resides. Second, there is a standard VMware ESX Server ".REDO log" on LUN 1. This .REDO log contains tracks that have been changed since the last time a .REDO log had been written out, or flushed, to LUN 2. This uses the preferred VMware VMFS "raw disk mapping" (RDM) functionality. The VMkernel 16 of FIG. 1 presents one e:\ drive to the Virtual Machine 14a from a combination of data it finds on the two LUNs 18a and 18b.

Figure 3:
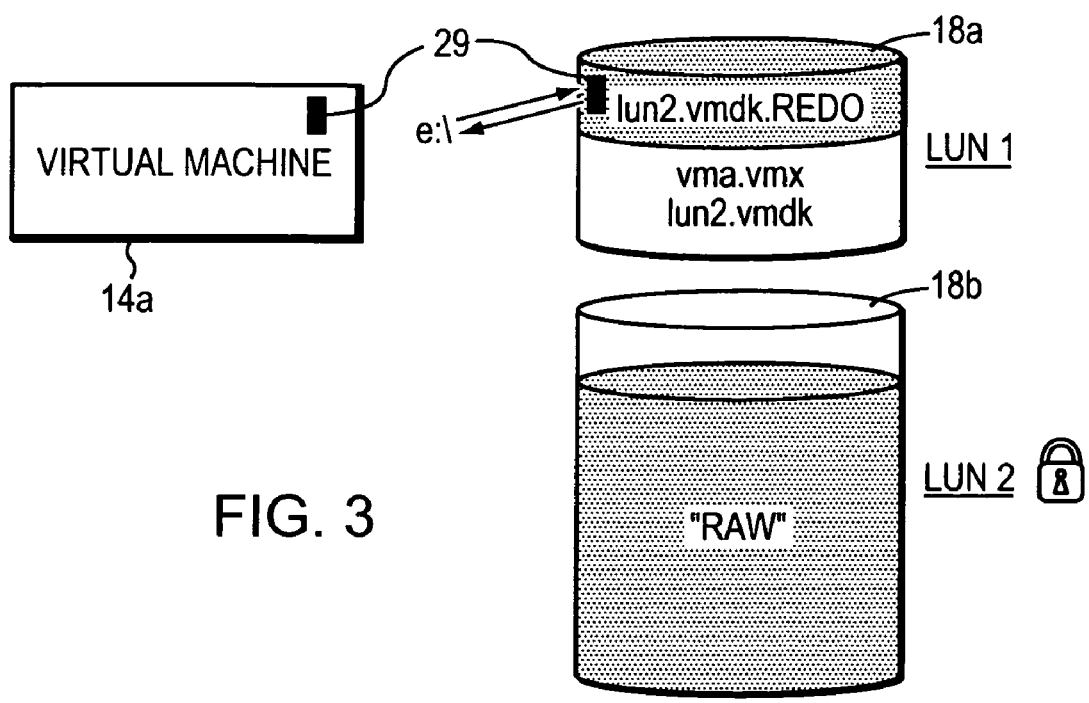
FIG. 3 is another simple schematic of at least a portion of the jukebox environment of FIG. 1.

Referring to FIG. 3, the case of which LUN (of the pair LUN1 and LUN2) gets used by disk input/output traffic (I/O) is illustrated by examining what happens when the Virtual Machine 14a attempts I/O on its disk. In the case of a read hit, where the requested data block 29 is already located on the .REDO log, i.e., data block 29 is more recent on LUN1 than the track on the RDM, the VMkernel will simply return that data to the VM from the .REDO log.

Figure 4:
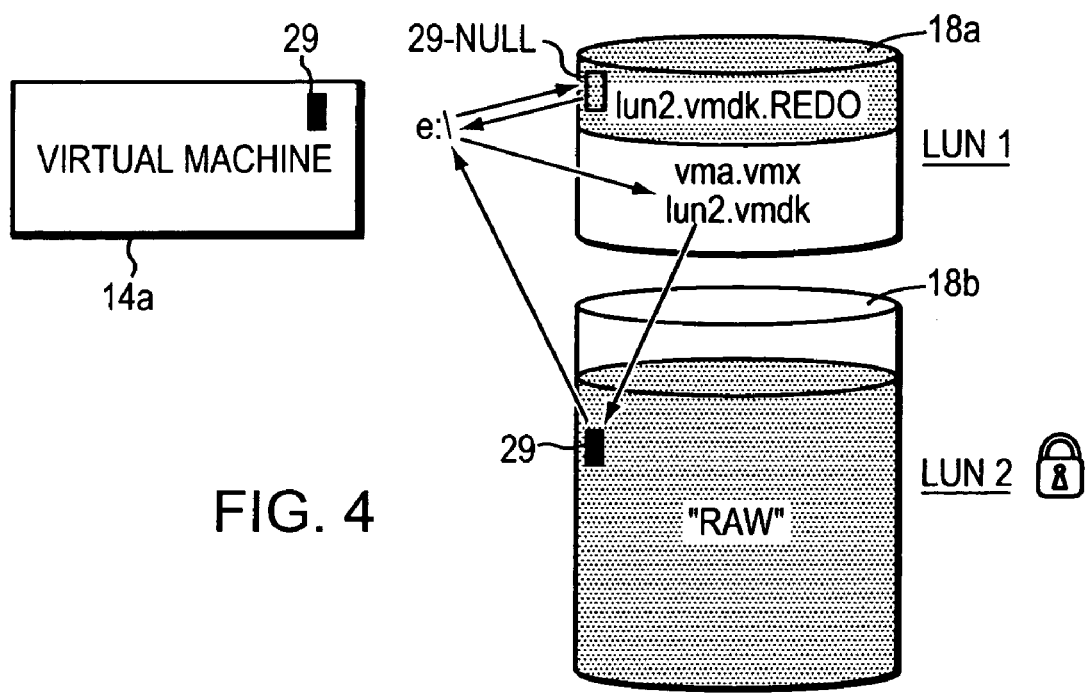
FIG. 4 is another simple schematic of at least a portion of the jukebox environment of FIG. 1.

Referring to FIG. 4, in the case of a read miss, where the requested data block 29 is not already located on the .REDO log, represented by 29 Null or a lack of data block 29, the VMkernel will return that data to the Virtual Machine 14a from its .vmdk file. In this case, the .vmdk file is a pointer to the LUN 2 RDM, where the track really resides having data block 29. The operation by which the vmkernel delivers the track to the VM is transparent to the user. This relies on the preferred VMware functionality.

Figure 5:
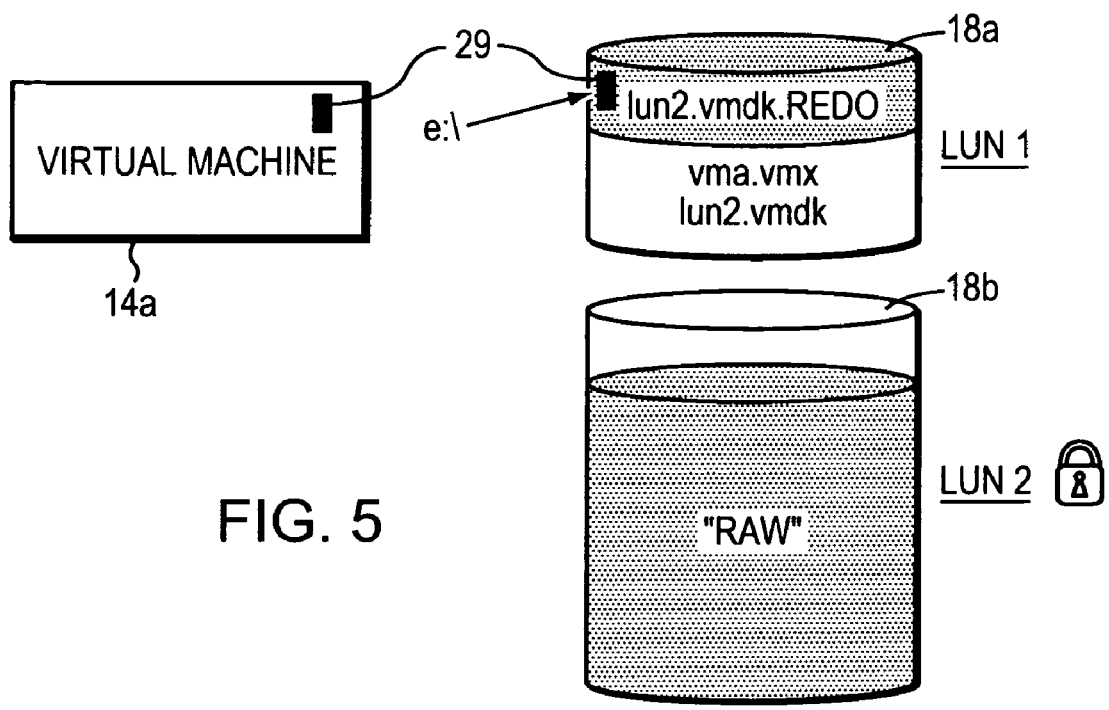
FIG. 5 is another simple schematic of at least a portion of the jukebox environment of FIG. 1.

Referring to FIG. 5, shown is a preferred implementation of the so-called Jukebox environment of FIG. 1, wherein all writes are only written to the .REDO logs on LUN 1. The jukebox will never actually write to LUN 2. The advantage is that a single so-called basis volume, located on the raw disk mapped (RDM) at LUN 2 can serve as the basis for multiple sets of metadata, in effect creating multiple versions of the saved volume, at different times $[t_1, t_2, t_3, t_4, \ldots t_n]$ that designate distinct data states correlated to the times. Using such a configuration, 25 terabytes worth of host data on a Symmetrix DMX800 is available to a user using the Virtual Machine 14a with the Symmetrix's TimeFinder clone targets, wherein the DMX800 has only 7 TB of raw storage. However, one disadvantage of this configuration is that VMFS (VMware File System) performance degrades rapidly after 1 GB of writes accumulate in the .REDO log, and fails completely (in the jukebox context, anyway) once the size of the .REDO log exceeds the volume on which it sits.

The key difference over the preferred so-called Jukebox embodiment over a known VMware environment is that all production standard volumes (STDs, including metadata and basis) are TimeFinder clone targets. The Jukebox is good choice when deployed for temporary end-user data, such as that used with a kiosk or training session. When the clone session is terminated, the Jukebox simply discards all user changes, and loads new data for the next session. Unlike VMware's native tools, this method relies on the speed of TimeFinder operations. Availability is nearly instant. It is highly scalable, having as many data states as BCVs directly related to a given LUN. Because TimeFinder is used to change the data on the LUN, it's transparent to the VMware kernel and, also to the end-user. The controller, target, and LUN numbers remain the same. None of the VMkernel's scalability limits apply (number of LUNs, etc.).

Figure 6:
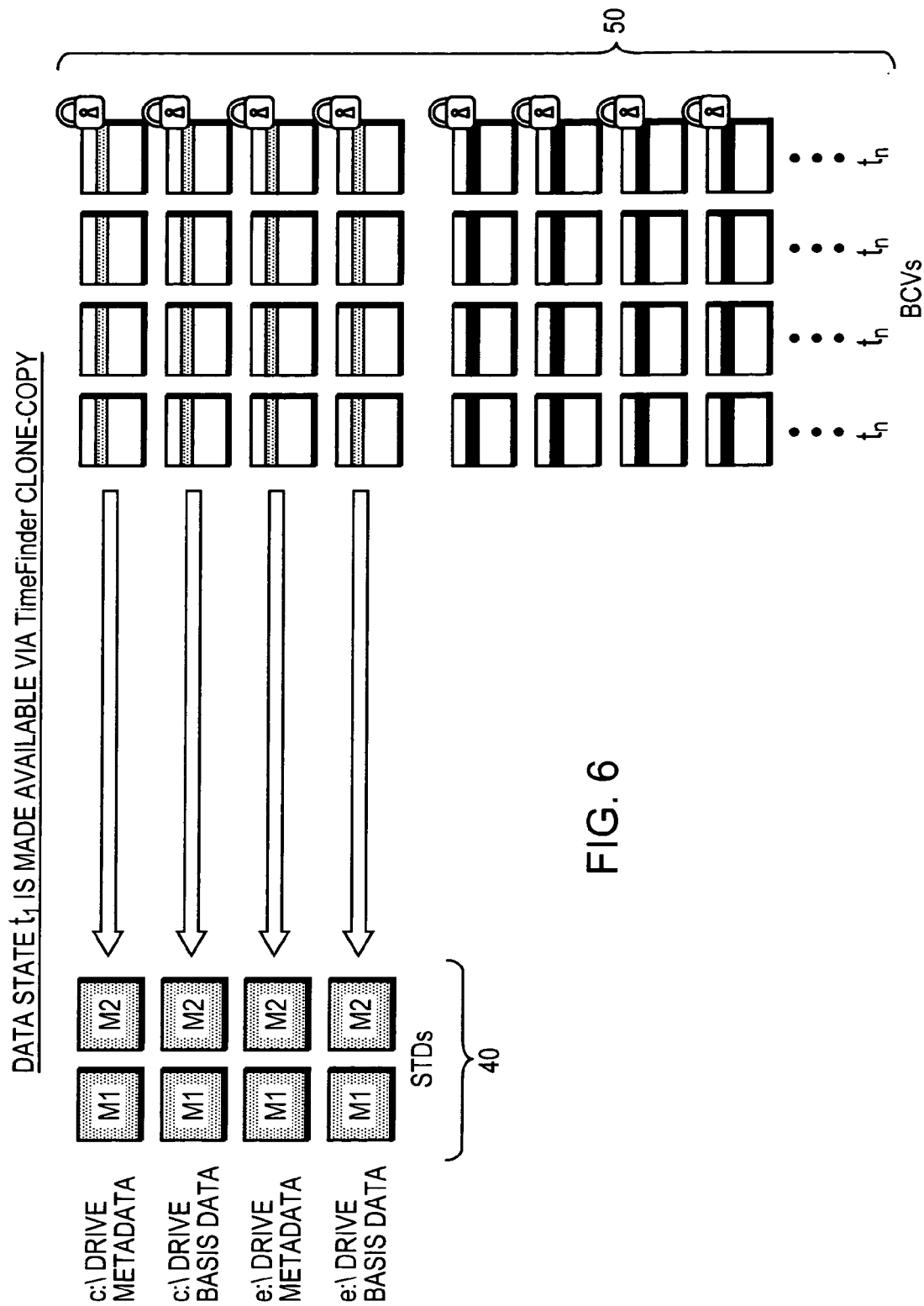
FIG. 6 shows an example case of using one set of preferred business continuance volumes as the source of data on the logical volumes of FIG. 1.

Referring to FIG. 6, to provide an optimal balance between storage conservation (back-end) and host performance (front-end), two different kinds of data protection are used within the Symmetrix. 2-Way-Mirrors (M1 and M2) are used on the standards (STDs) 40, increasing the speed of random reads (which is highly desirable in production), while RAID 3+1 is used on the BCVs 50, saving significant space. This is true of both "basis" and "metadata" volumes. When a volume is required in production, it is simply invoked with a TimeFinder clone-copy script. This makes the volume available in approximately 15 seconds, while tracks continue to be copied in the background. To make a data state available, here, called $t_1$, four volumes are copied together. Each session requires one "basis" volume plus one "metadata" volume—for the two drives (c:\ and e:\) used by the Virtual Machine. On current hardware, all volumes are ready for use in approximately 60 seconds. At the end of the VM session, these clone volumes are automatically discarded.

Figure 7:
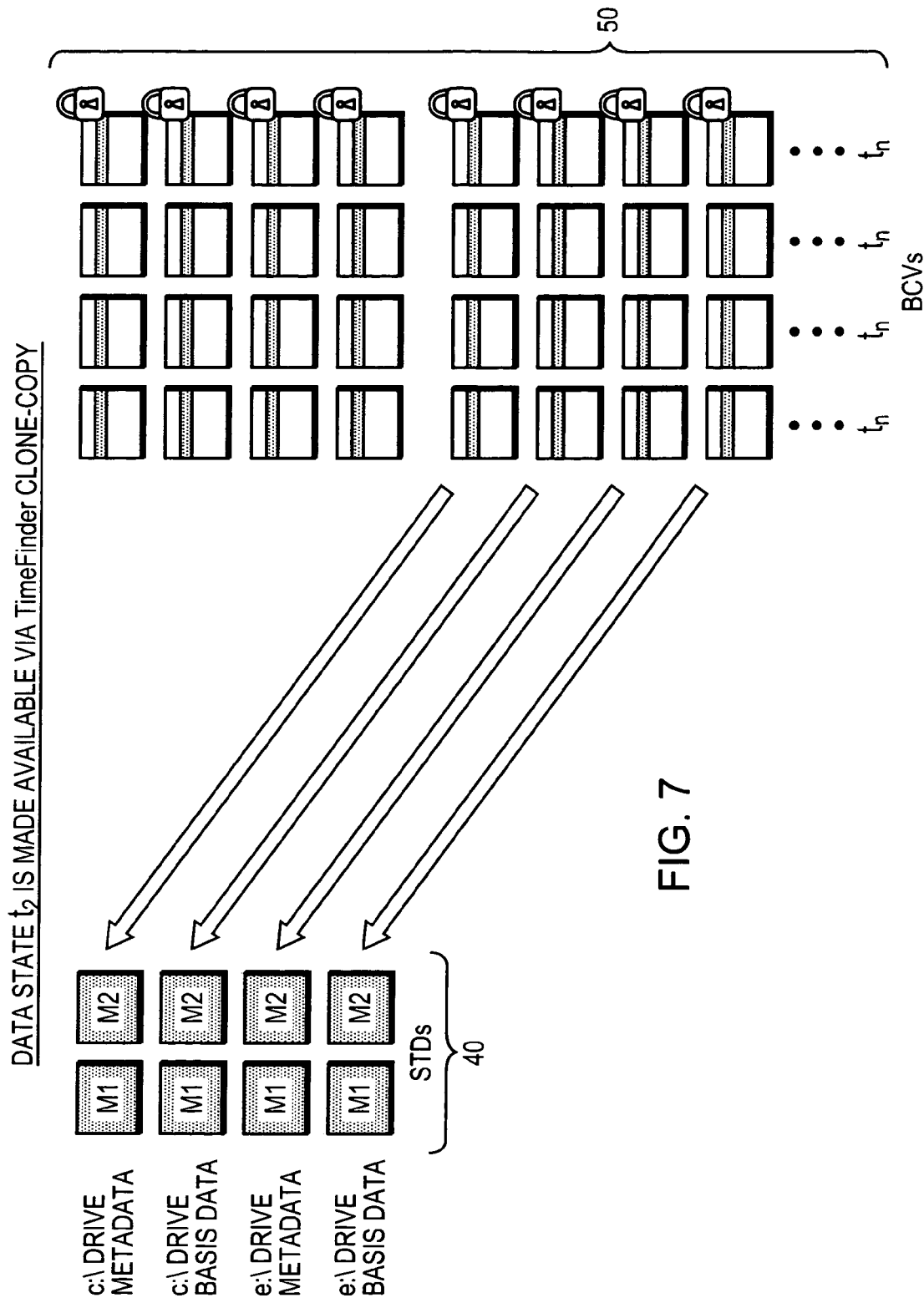
FIG. 7 shows an example case of using another set of preferred business continuance volumes as the source of data on the logical volumes of FIG. 1.

Referring to FIG. 7, to make a different data state available, here, called $t_2$ the VM is quiesced while four new BCV volumes 50 are copied together to its STDs 40 using the same kind of TimeFinder clone-copy operation. This has the net effect of changing the data "underneath" VMware, so the vmkernel is unaware of the change. As discussed below, the second set of basis volumes may or may not differ from the first.

Figure 8:
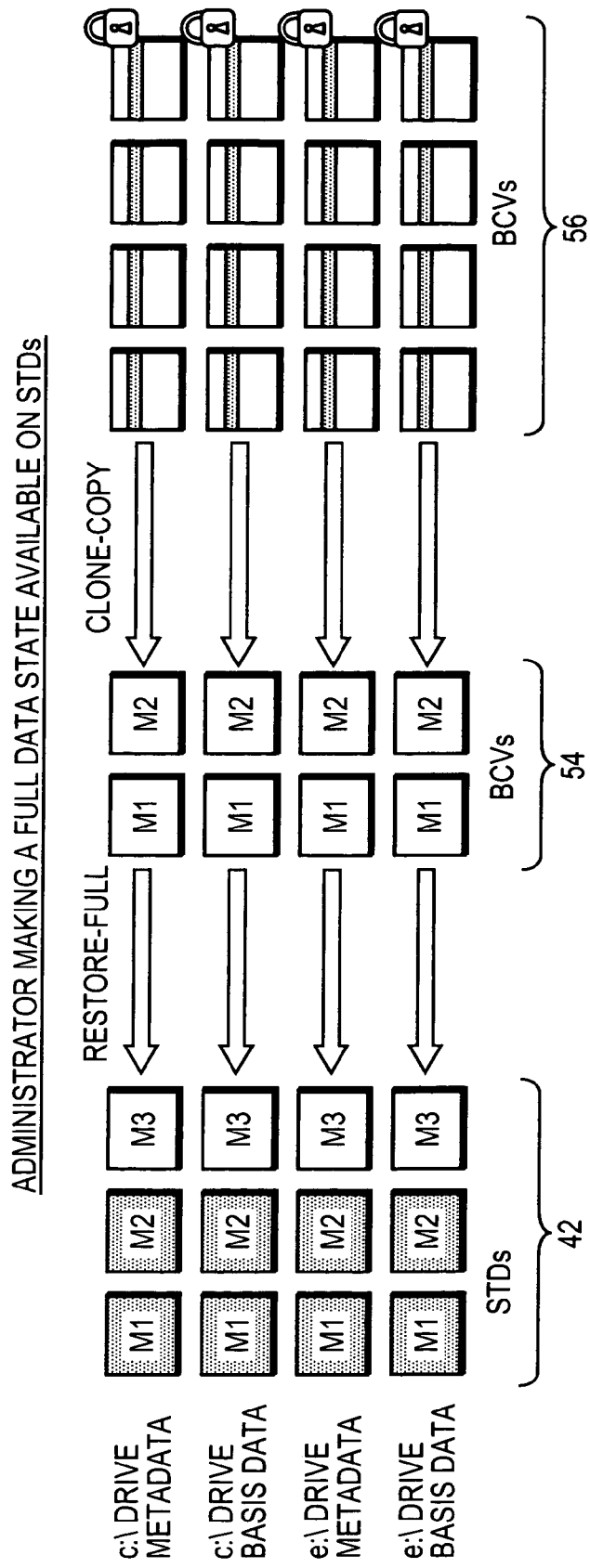
FIG. 8 shows an example case of making a full state available on standard volumes from business continuance volumes.

Referring to FIG. 8, although the Jukebox is simple to use, it is a bit more complicated for an administrator to load the first time. Because of the change in geometry (i.e., RAID 3+1 to 2-Way-Mirrors), it is highly desirable to compel the Symmetrix microcode to avoid its automatic emulation mode. Scripts copy data from so-called real BCVs 56 to the STDs 42, effecting a change in geometry via a set of interim BCVs 54. The inventor has recognized that there may be other ways to get the same outcome, but this method has been proven to work, in both storage directions.

Referring again to FIG. 8, a TimeFinder clone-copy operation copies all the BCV tracks onto another set of BCVs with the same size, emulation of data format (i.e., count key data or fixed block architecture), and protection as the STDs mapped to the ESX Server. However, the clone target is a 2-Way-Mirror, here called a transient BCV. After the clone finishes, the moving mirror of the transient BCV does a full restore to the STDs. Finally, the transient volume is discarded. The STDs and BCVs are truly independent at this point. Of course, four such volumes are needed, in this example.

Referring to FIG. 5 again, the inventor has recognized that at some point the administrator would start the VM, make whatever changes are required within it, and shut it down. Before booting up the VM, however, the administrator needs to decide where the writes should land. All writes will be written out automatically to the .REDO log by booting the Virtual Machine with its disks set to run in the appropriate mode. Recall that the total number of changes made by the administrator should never exceed 1 GB, as documented above. If the changed tracks are likely to approach 1 GB, then the administrator should start from a new basis volume instead, by booting the Virtual Machine with its disks set to run in a more persistent mode.

Figure 9:
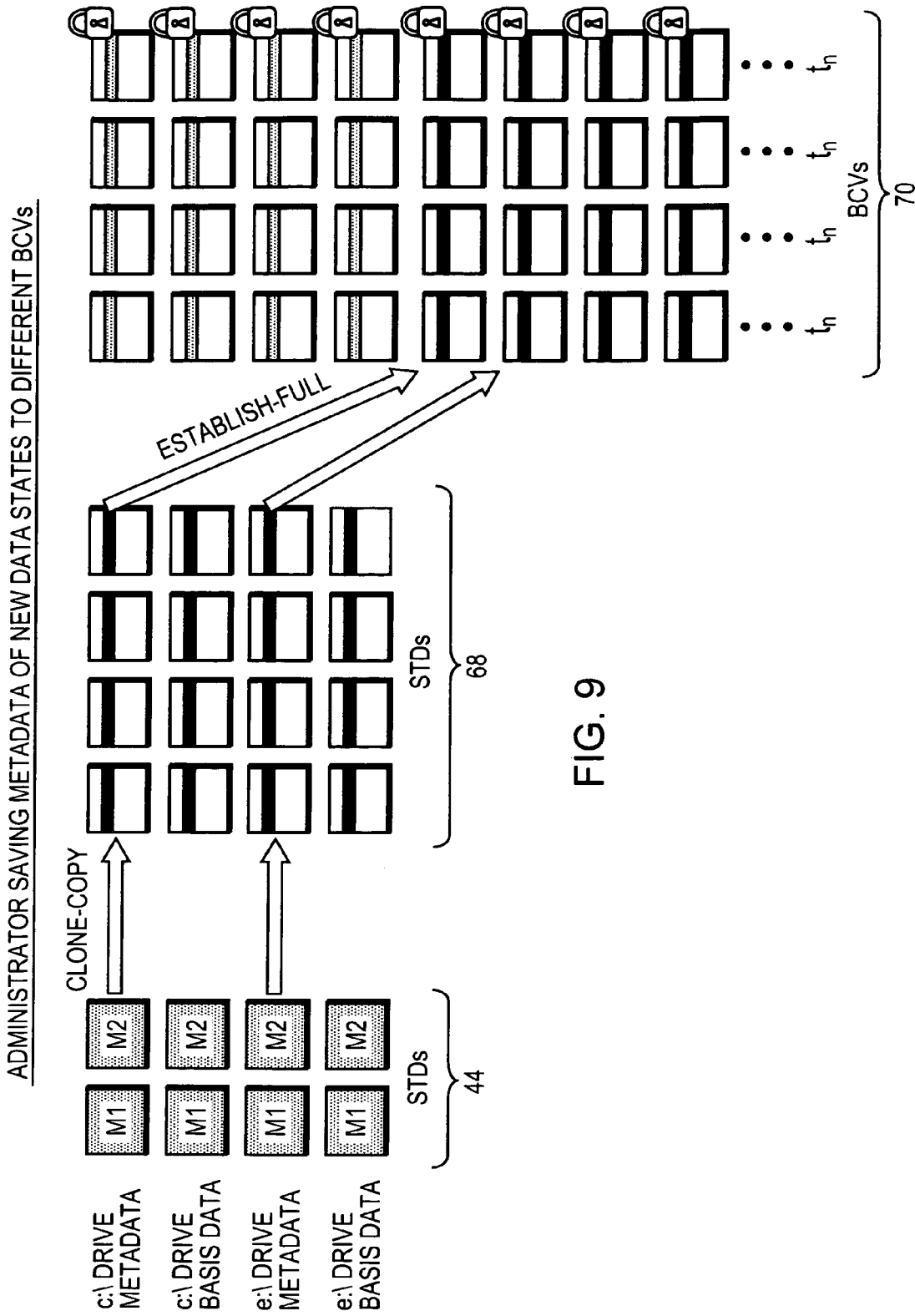
FIG. 9 shows an example case of saving metadata of new data states to different business continuance volumes.

FIG. 9 shows an example case of an administrator saving metadata of new data states to different BCVs 70 from STDs 44 via a set of interim STDs 68. The administrator loads, for example, data state $t_{39}$. Then the administrator boots the VM, makes some minor changes within it, and saves the new metadata as $t_{40}$. To save data state $t_{40}$, the metadata STD volumes must be saved to different BCVs, which will increase the variety of $t_n$, data states available for future use. Because of another change in geometry (i.e., 2-Way-Mirrors back to RAID 3+1), it is again highly desirable to compel the latest Symmetrix microcode to avoid its automatic emulation mode. This change in geometry is also effected by a similar set of interim STDs, this time a transient RAID 3+1 STD. The existence of the new data state $t_{40}$, and the changes it contains, should be entered into the database. Note that all four volumes may be saved if it is preferable to save a new basis volume instead of merely saving the metadata (e.g., if the deltas in the metadata .REDO log would exceed 1 GB).

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a server in communication with a data storage system having physical data storage mapped to logical volumes, a method for providing a plurality of different virtual computing environments:
   (a) configuring the server as a virtual machine server including a plurality of virtual machines and a virtual kernel; wherein each virtual machine includes a configuration file so that each virtual machine can be booted separately by the virtual machine server with or from its mapped logical volumes;
   (b) storing a plurality of logical units in the data storage system, the logical units consisting of a plurality of first logical volumes associated with metadata in a first storage bank and a plurality of second logical volumes associated with basis data in a second bank wherein the logical units are assigned to virtual machines and wherein all IO writes are written only to the logical units containing a REDO log allowing other logical volumes to maintain the corresponding data; and
   (c) making first and second logical volumes selected from the first storage bank and the second storage bank available to the virtual machine server through a mirroring operation, wherein one or more second logical volumes associated with the basis data and being selected from the plurality of second logical volumes stored in the second storage bank are paired with a plurality of first logical volumes associated with the metadata from the first storage bank to create a plurality of different virtual computing environments and such that the same first logical volume of the basis data may be paired with different second logical volumes of metadata in the different virtual computing environments.

2. The method of claim 1, wherein data protection is provided by employing a RAID parity scheme.

3. The method of claim 1, wherein the virtual server includes a database.

4. The method of claim 3, wherein data protection is provided by employing a RAID parity scheme.

5. A system for providing a plurality of different virtual computing environments, the system comprising:
   a virtual machine server including a plurality of virtual machines, a database, and a virtual kernel; wherein each virtual machine includes a configuration file so that each virtual machine can be booted separately by the virtual machine server with or from its mapped logical volumes; and
   a data storage system having physical data storage mapped to logical volumes and being in communication with the virtual machine server; and
   computer-executable program logic executable at the virtual server for providing a plurality of different virtual computing environment by executing the steps of:
   (a) storing a plurality of logical units in the data storage system, the logical units consisting of a plurality of first logical volumes associated with metadata in a first storage bank and a plurality of second logical volumes associated with basis data in a second bank wherein the logical units are assigned to virtual machines and wherein all IO writes are written only to the logical units containing a REDO log allowing other logical volumes to maintain the corresponding data;
   (b) making first and second logical volumes selected from the first storage bank and the second storage bank available to the virtual machine server through a mirroring operation, wherein one or more second logical volumes associated with the basis data and being selected from the plurality of second logical volumes stored in the second storage bank are paired with a plurality of first logical volumes associated with the metadata from the first storage bank to create a plurality of different virtual computing environments and such that the same first logical volume of the basis data may be paired with different second logical volumes of metadata in the different virtual computing environments.

6. The system of claim 5, wherein data protection is provided by employing a RAID parity scheme.

7. The system of claim 5, wherein the virtual server includes a database.

8. The system of claim 7, wherein data protection is provided by employing a RAID parity scheme.

9. A computer program product including a nontransitory computer-readable storage medium encoded with program logic for allowing the following computer-executable steps to occur for providing a plurality of different virtual computing environments in a data storage environment having a server in communication with a data storage system having physical data storage mapped to logical volumes, wherein the server is configured as a virtual machine server including a plurality of virtual machines, and a virtual kernel, wherein each virtual machine includes a configuration file so that each virtual machine can be booted separately by the virtual machine server with or from its mapped logical volumes, the computer program logic configured for executing the following steps:
   (a) storing a plurality of logical units in the data storage system, the logical units consisting of a plurality of first logical volumes associated with metadata in a first storage bank and a plurality of second logical volumes associated with basis data in a second bank wherein the logical units are assigned to virtual machines and wherein all TO writes are written only to the logical units containing a REDO log allowing other logical volumes to maintain the corresponding data; and
   (b) making first and second logical volumes selected from the first storage bank and the second storage bank available to the virtual machine server through a mirroring operation, wherein one or more second logical volumes associated with the basis data and being selected from the plurality of second logical volumes stored in the second storage bank are paired with a plurality of first logical volumes associated with the metadata from the first storage bank to create a plurality of different virtual computing environments and such that the same first logical volume of the basis data may be paired with different second logical volumes of metadata in the different virtual computing environments.

10. The computer product of claim 9, wherein data protection is provided by employing a RAID parity scheme.

11. The computer product of claim 9, wherein the virtual server includes a database.

12. The computer product of claim 11, wherein data protection is provided by employing a RAID parity scheme.

* * * * *